US010341414B2

(12) United States Patent
Jiang et al.

(10) Patent No.: US 10,341,414 B2
(45) Date of Patent: Jul. 2, 2019

(54) FILE SHARING USING REMOTE APPLICATIONS (71) Applicant: VMware, Inc., Palo Alto, CA (US)

(72) Inventors: Hai Ou Jiang, Beijing (CN); Dong Wang, Beijing (CN); Kun Shi, Beijing (CN); Jin Yu, Beijing (CN); Wenlong Shao, Beijing (CN); Feng Yan, Beijing (CN)

(73) Assignee: VMware, Inc., Palo Alto, CA (US)

( * ) Notice: Subject to any disclaimer, the term of this patent is extended or adjusted under 35 U.S.C. 154(b) by 69 days.

(21) Appl. No.: 14/530,618

(22) Filed: Oct. 31, 2014

(65) Prior Publication Data

US 2016/0127447 A1 May 5, 2016

(51) Int. Cl.
*H04L 29/08* (2006.01)
*H04L 29/06* (2006.01)
*G06F 3/0486* (2013.01)
*G06F 3/038* (2013.01)
*G06F 9/451* (2018.01)
*G06F 16/10* (2019.01)

(52) U.S. Cl.
CPC .............. *H04L 67/06* (2013.01); *G06F 3/038* (2013.01); *G06F 3/0486* (2013.01); *G06F 9/452* (2018.02); *G06F 16/10* (2019.01); *H04L 67/42* (2013.01); *G06F 2203/0383* (2013.01)

(58) Field of Classification Search
None
See application file for complete search history.

(56) References Cited

U.S. PATENT DOCUMENTS

| 5,724,595 | A | * | 3/1998 | Gentner | G06F 17/30882 707/E17.013 |
| 7,552,189 | B2 | * | 6/2009 | Mehra | G06F 9/547 707/999.1 |
| 2002/0174010 | A1 | | 11/2002 | Rice | |
| 2005/0240943 | A1 | * | 10/2005 | Smith | G06F 9/465 719/328 |

(Continued)

OTHER PUBLICATIONS

Google Docs, Sheets, and Slides, [Retrieved on Jul. 30, 2015]. Retrieved from the Internet: <https://en.wikipedia.org/wiki/Google_Docs,_Sheets,_and_Slides>.

(Continued)

*Primary Examiner* — Thomas J Dailey
(74) *Attorney, Agent, or Firm* — Patterson + Sheridan, LLP (57) ABSTRACT Techniques are disclosed herein for file sharing using remote applications. One embodiment provides a computer-implemented method that includes receiving, at a computing device, a selection of a reference for accessing the file, where the reference includes a first identifier specifying the file stored on a host server remotely located with respect to the computing device and a second identifier specifying an application that is running on the host server and that is configured to open files of a same type as the file. The method further includes establishing a remote connection to the application specified by the second identifier, by connecting to the host server and causing the application to be launched on the host server. In addition, the method includes causing the application to open the file specified by the first identifier and the user interface of the application to be remoted to the computing device.

19 Claims, 4 Drawing Sheets (56) References Cited

U.S. PATENT DOCUMENTS

| | | |
|---|---|---|
| 2009/0150486 A1 | 6/2009 | Franco et al. |
| 2010/0333179 A1 | 12/2010 | Chien et al. |
| 2011/0055714 A1* | 3/2011 | Vemulapalli .......... G06F 9/5077 |
| | | 715/739 |
| 2011/0184993 A1* | 7/2011 | Chawla ............. G06F 17/30194 |
| | | 707/802 |
| 2011/0246552 A1* | 10/2011 | Nicholson ............... H04L 67/14 |
| | | 709/202 |
| 2014/0123221 A1* | 5/2014 | Farina ................. H04L 63/0272 |
| | | 726/3 |
| 2014/0250170 A1 | 9/2014 | Duggal |

OTHER PUBLICATIONS

International Search Report dated Feb. 22, 2016 for Application No. PCT/US2015/057889.

* cited by examiner

FILE SHARING USING REMOTE APPLICATIONS

BACKGROUND

When a user remotely accesses an application configured for mouse-and-keyboard based commands, the user controls a particular server machine remotely from his or her computing device. This type of interaction is commonly referred to as a "remote" session. Throughout a remote session, video output data generated at the server machine, such as frames captured from a remote agent, is routed to the user's computing device, where such video data includes a user interface (UI) of an operating system and/or applications executing on the host machine. Conversely, user input data received at the user's computing device is routed to the server machine, where the operating system and/or applications interpret the routed input data as if the input data was received locally at the server machine.

Some publicly available cloud storage services, such as Google Docs™ and Dropbox®, permit files to be shared by users over a network (e.g., the Internet). These services are typically used only for pure storage and often only support a limited number of file types. In addition, such cloud storage services may require that any user wishing to access a file (e.g., a Microsoft Word file) have the corresponding application (Microsoft Word) installed on their individual client device. However, users may wish to share files in their remote sessions without such constraints.

SUMMARY

One embodiment provides a method for sharing a file. The method generally includes receiving, at a computing device, a selection of a reference for accessing the file, where the reference includes a first identifier specifying the file stored on a host server remotely located with respect to the computing device and a second identifier specifying an application that is running on the host server and that is configured to open files of a same type as the file. The method further includes establishing a remote connection to the application specified by the second identifier, by connecting to the host server and causing the application to be launched on the host server. In addition, the method includes causing the application to open the file specified by the first identifier and the user interface of the application to be remoted to the computing device.

Further embodiments of the present invention include a computer-readable storage medium storing instructions that when executed by a computer system cause the computer system to perform the method set forth above, and a computer system programmed to carry out the method set forth above.

DETAILED DESCRIPTION

Embodiments presented herein provide an approach for sharing files in a remote access session. In response to a file being dragged to a specific area of a remote access client window, the remote access client is configured to determine whether an application is available for opening the file. If an application is available, then the remote access client generates a reference, and in particular a universal resource identifier (URI), for sharing the file. In one embodiment, the remote access client may populate the URI with a file identifier (ID) corresponding to the file and an application ID corresponding to the application for opening the file. The URI may further include the address of a virtual machine (VM) or connection broker to connect to and authentication credentials such as a username and password combination, as well as multiple-factor authentication tokens (e.g., an RSA authentication token and an Active Directory (AD) authentication token). For security purposes, the access credential may include one-time consumption credentials (e.g., one-time consumption authentication tokens) that allow the file to be accessed only once.

After the URI is created, the user may deliver the URI, or a shortcut containing the URI, to another user over a network (e.g., an intranet or the Internet). The other user may then click on the URI or shortcut to access the file. Accessing the file may include connecting to the VM either directly or via a connection broker (depending on the address in the URI) and using the authentication credentials in the URI, executing the application identified by the application ID in the URI, and opening the file identified by the file ID in the URI.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
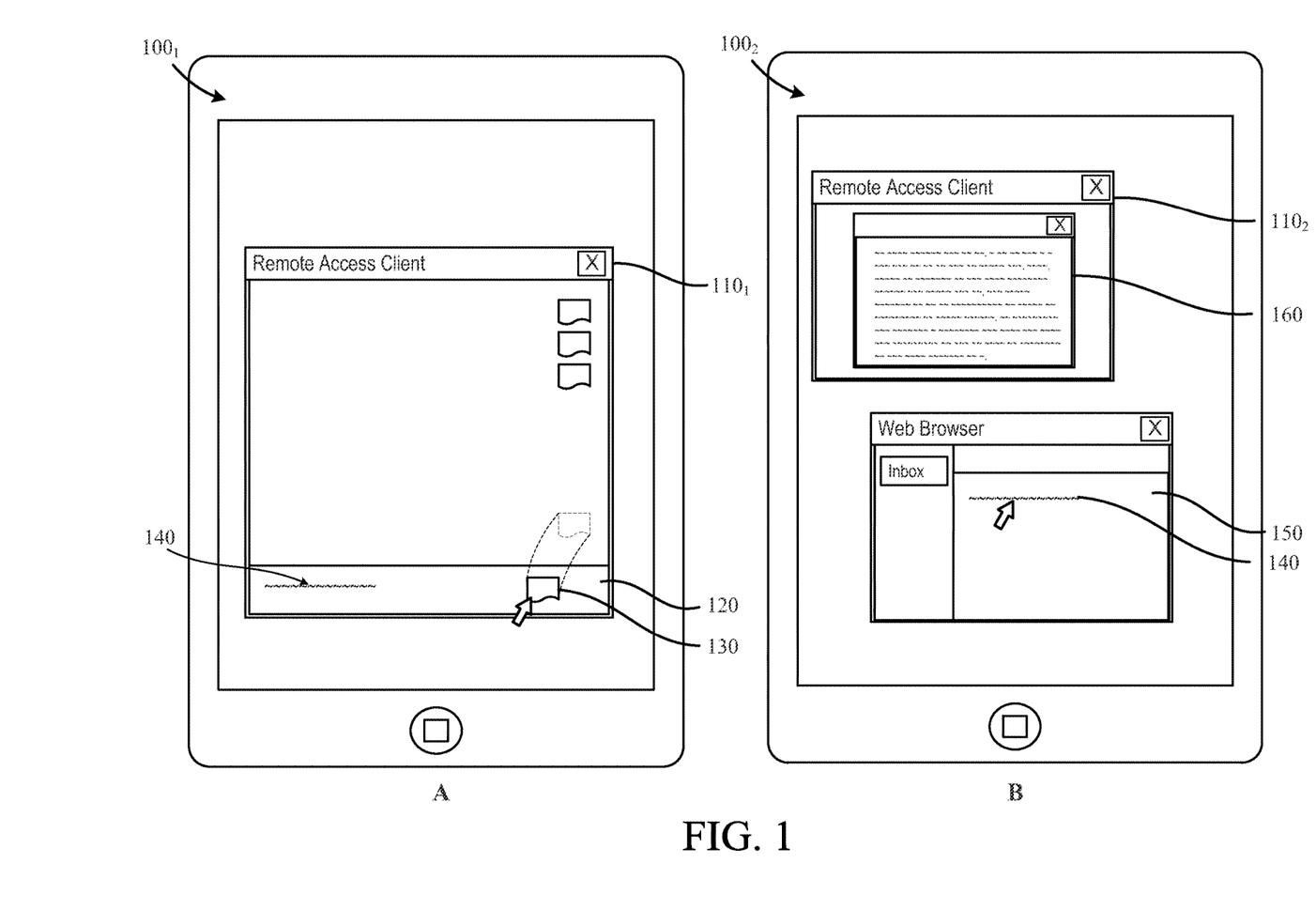
FIG. 1 illustrates an approach for generating and using a file sharing uniform resource indicator, according to an embodiment.

FIG. 1 illustrates an approach for generating and using a file sharing URI 140, according to an embodiment. As shown in panel A, a user may interact with a client device $100_1$ to create URI 140 by dragging a file 130 to a particular area 120 in a window of a remote access client $110_1$. Remote access client $110_1$ is configured to facilitate a remote session with a virtual machine (not shown) by, among other things, receiving and displaying video output generated at a server hosting the VM and routing user input received at the user's device to the server, where the input is injected into the VM.

Illustratively, area 120 is depicted as a rectangle at the bottom of the window of remote access client $110_1$, but area 120 may generally be of any shape and size. Responsive to file 130 being dragged to area 120, remote access client $110_1$ determines whether an application for opening file 130 is available in the VM. It should be recognized that files, or types of files, may be associated with particular applications capable of opening the files or file types. For example, remote access client $110_1$ may maintain associations between file extensions and corresponding applications. In such a case, remote access client $110_1$ may determine (e.g., by crawling a registry of the VM's operating system) whether an application is available for opening file 130 based on its file extension.

If no application is installed for opening file 130 or if the application is otherwise unavailable, then deployment of such an application is required, and remote access client $110_1$ may prompt the user as to this requirement. Otherwise, if an application is available that can open file 130, then remote access client $110_1$ creates URI 140 for accessing file 130. In one embodiment, URI 140 may be a character string that includes a file ID corresponding to file 130, an application ID corresponding to the application that opens file 130, and the address of the VM or a connection broker, which is disposed between client device $100_1$ and the VM server and manages VM connections, to connect to. The character string may also be prefixed with a particular prefix for launching remote access client $110_1$, similar to how "http" is used as a prefix for Internet universal resource locators (URLs) that, when clicked, launch web browsers. However, rather than launching a web browser, clicking on URI 140 launches a remote client application, which in turn connects to an application deployed on a VM executing in a remote host server and causes a file to be opened by the application.

In another embodiment, URI 140 may also include authentication credentials for logging in to the VM, such as a username and password combination that remote access client $110_1$ has stored. Such credentials may be used to log directly into the VM after URI 140 is selected, without requiring the user to manually enter log in credentials. In addition, URI 140 may include one-time consumption credentials that enable file 130 to be accessed once, after which the credentials are invalidated for security purposes. The one-time consumption credentials may include multiple-factor authentication tokens, such as an RSA authentication token, an AD authentication token, or the like in a security assertion markup language (SAMLart) stream.

After URI 140 is created, the user may send URI 140 to another user in any feasible manner, such as by copying and pasting URI 140 into an e-mail message. Alternatively, the user may create a shortcut for URI 140. The shortcut may be implemented as a file containing the URI, and the user may send this shortcut to the other user as, e.g., an e-mail attachment. Shortcuts may be created in lieu of URI character strings, or using URI character strings that are created first. For example, a user may drag a URI onto his or her desktop in the Windows® operating system to create a URI shortcut.

As shown in panel B, the other user who receives URI 140 on a client device $100_2$ may click on URI 140 to access file 130. Illustratively, URI 140 is received by the other user in an e-mail message 150. Clicking on URI 140 invokes remote access client $110_2$, which then requests connection to the VM or connection broker referenced in the URI and to the application identified by the URI's application ID. Remote access client $110_2$ may be the same type of application as remote access client $110_1$, or a different type of application with similar capabilities. If the URI includes authentication credentials, remote access client $110_2$ may also present such credentials to the server hosting the VM. In turn, the server may authenticate the credentials, establish a connection between remote access client $110_2$ and the VM, and if the credentials are authenticated, launch the application identified by the application ID in the VM. Then, remote access client $110_2$ requests that file 130, indicated by the file ID in the URI, be opened in the application 160 that is now executing in the VM, and the server opens this file. In one embodiment, only the application identified by the application ID and the file identified by the file ID are shown in the window of remote access client $110_2$. As a result, the user who receives URI 140 is only able to access file 130 and not other files or resources that were not shared.

As previously noted, URI 140 may contain one-time authentication credentials. In such a case, the server may maintain a list of valid credentials and invalidate the credentials once they are used. Of course, the authentication credentials may also be valid for multiple uses, as opposed to a single use, in which case the server may invalidate the credentials after a given number of uses.

In further embodiments, the user may be permitted to configure various file sharing policies via remote access client $110_1$, or alternatively via the server or the connection broker disposed between client device $100_1$ and the server. For example, client $110_1$ may maintain a list of all URIs that it has created. If the user no longer wishes to share a particular file, then the user may disable sharing of the file through client $110_1$, in which case client $110_1$ may communicate with the server to invalidate the authentication credentials for that file. As another example, the server may maintain a user-defined white list of unique IDs (e.g., media access control (MAC) addresses) of devices that are permitted to use certain URIs or types of URIs to access or download files, and as part of the automatic authentication process, the server may ensure that the device attempting to connect to the VM is associated with a unique ID that is in the white list. Other file sharing policies may include adjusting a time limit for accessing a file, disabling downloading of a file, and the like.

Figure 2:
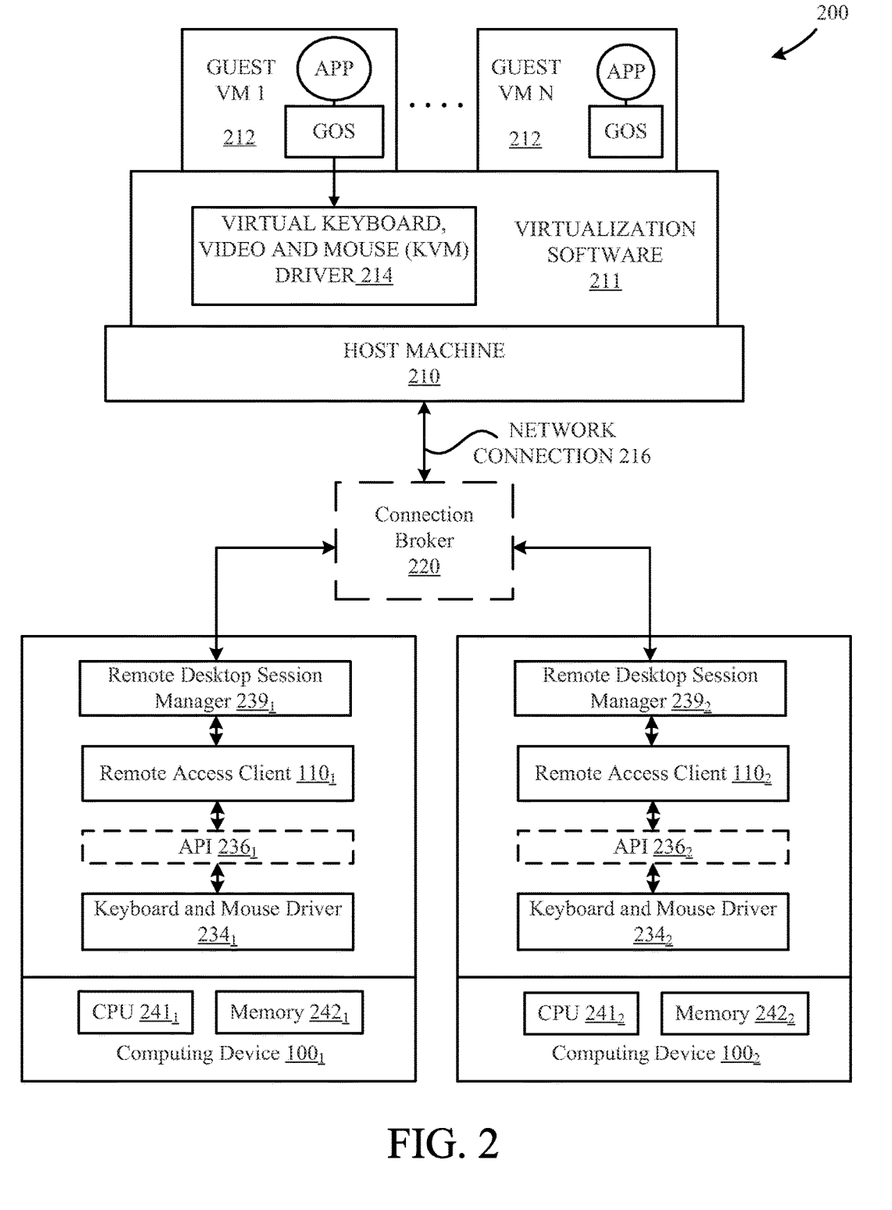
FIG. 2 is a block diagram of a computing device connected through a network to a host machine to provide a remote session, according to an embodiment.

FIG. 2 is a conceptual diagram 200 of a host machine 210 (also referred to herein as "server") connected through a network 216 to computing devices $100_{1-2}$ that provide remote sessions. Host machine 210 may be a general purpose computer system comprising one or more central processing units (CPUs) 205 and memory 206, among other hardware, and executing one or more applications, virtual machines, or other entities. Likewise, computing devices $100_{1-2}$ may be general purpose computer systems comprising CPU(s) $241_{1-2}$ and memory $242_{1-2}$ and executing applications including remote access clients $110_{1-2}$ and remote desktop session managers $239_{1-2}$, among other things.

In one embodiment, host machine 210 includes a virtualized computer system having a plurality of guest virtual machines 212 (VMs), wherein each guest VM 212 is a virtual machine implemented by virtualization software 211, or a component thereof. In various embodiments, the virtualization software 211 may be a hypervisor or a virtual machine manager (VMM). A virtual keyboard, video, and mouse (KVM) driver 214 implements, for a particular one of guest VMs 212, virtual user interface devices and communicates user inputs from and system outputs (such as display and audio information) to computing devices $100_{1-2}$.

Each guest VM may include a guest operating system (GOS) and one or more applications (APP). The guest operating system may be a commodity operating system, such as Microsoft Windows®, or a specialized operating system designed specifically to work with virtualization software 211 (sometimes referred to as a "paravirtualized OS"). In one embodiment, virtualization software 211 is stored on a physical data storage medium (not shown) forming part of host machine 210, whereas virtual disks (not shown) for each guest virtual machine are mapped by virtualization software 211 to files that may be stored remotely or locally.

Computing devices $100_{1-2}$ communicate with host machine 210 using the network 216 such that IO data may be communicated between computing devices $100_{1-2}$ and host machine 210. An optional connection broker 220 may be disposed between computing devices $100_{1-2}$ and host machine 210 to, for example, facilitate enhanced authentication and security features and/or provide simplified or customized connectivity options.

Computing devices $100_{1-2}$ execute respective remote access clients $110_{1-2}$ that are configured to facilitate remote sessions with one or more of guest VMs 212. Computing devices $100_{1-2}$, which may each have a mouse and keyboard attached or may instead be a touchscreen device, is configured to provide mouse-and-keyboard based commands to applications designed to accept such commands. The applications may execute remotely as shown in FIG. 2, or the application may execute locally on computing devices $100_{1-2}$, e.g., as a guest operating system executing in a virtual machine.

In a remote session, remote desktop session manager $239_{1-2}$ receives video output data generated by the guest operating system of guest VM 212 and transmits the video output data to remote access clients $110_{1-2}$. In turn, remote access clients $110_{1-2}$ issue instructions to display the video output data and any video overlays that are generated by remote access clients $110_{1-2}$. Conversely, input data, such as mouse and keyboard based input, are collected at computing devices $100_{1-2}$ via keyboard and mouse drivers $124_{1-2}$ and/or an application programming interfaces (APIs) $236_{1-2}$ that assist in processing input, converted to mouse and/or keyboard commands by remote access clients $110_{1-2}$, and transmitted to host machine 210 via remote desktop session managers $239_{1-2}$. Upon receipt, virtualization software 211 passes the user input to virtual keyboard, video, and mouse driver 214, which injects the user inputs into the corresponding guest VM 212 using appropriate device drivers that are installed in the guest operating system. Display updates from guest VM 212 may then be received by virtual keyboard, video and mouse driver 214 and translated into an appropriate desktop remoting protocol and sent back to computing devices $100_{1-2}$ to update the display thereon.

In one embodiment, remote access client $110_1$ executing in computing device $100_1$ is configured to generate URIs for file sharing in response to, e.g., a file being dragged to a predefined area of the remote access client $110_1$ window. The URIs that are generated may have a specific scheme and include an address of a VM or connection broker to connect to, a file ID specifying the file being shared, an application ID specifying an application for opening the file, as well as authentication credentials such as a username and password combination and multiple-factor authentication tokens. A user may then deliver the URI, or a shortcut containing the URI, to another user on computing device $100_2$, whereupon the other user may click on the URI or shortcut to access the file. In particular, clicking on the URI or shortcut may launch remote access client $110_2$ in computing device $100_2$, and remote access client $110_2$ may automatically connect to the VM or connection broker referenced in the URI using the authentication credentials contained in the URI, launch the application identified by the application ID in the URI, and cause the file identified by the file ID in the URI to be opened by the application. Although two computing devices $100_{1-2}$ are depicted, it should be understood that, in some cases, one device may both generate the URI for sharing a file and be used to access the file with the URI.

Figure 3:
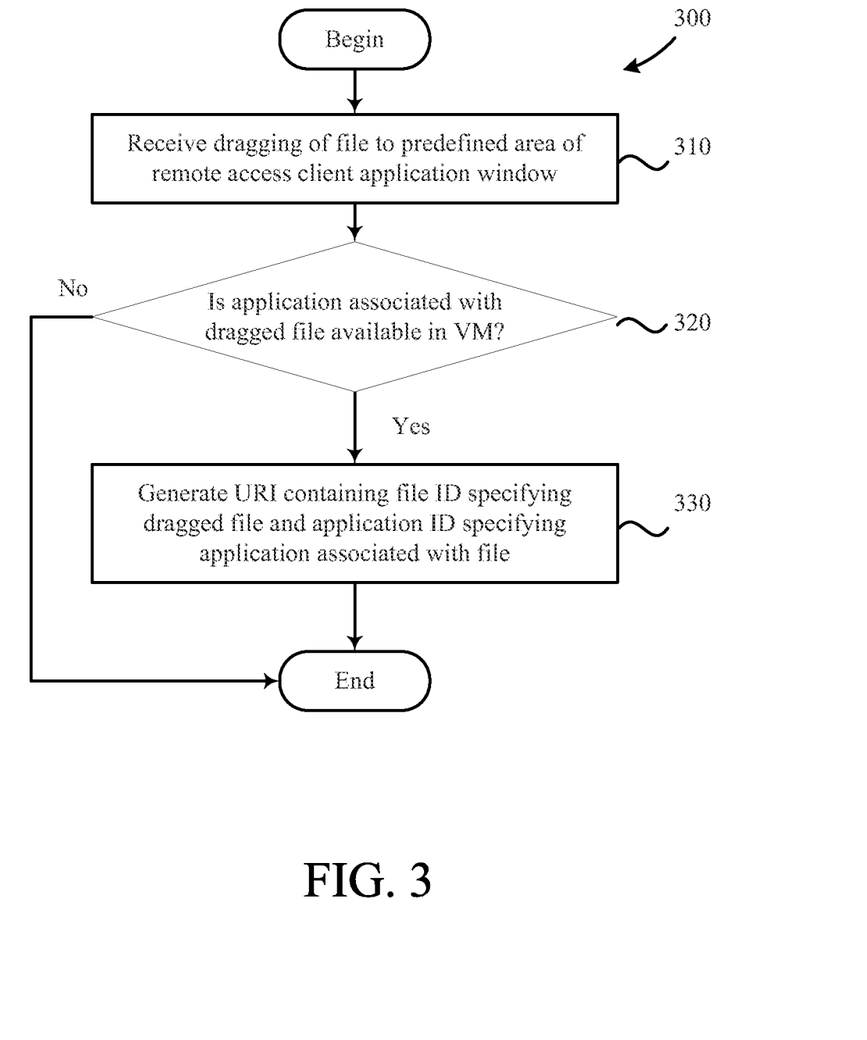
FIG. 3 is a flow diagram of method steps for generating a URI, according to an embodiment.

FIG. 3 is a flow diagram of a method 300 for generating a URI, according to an embodiment. As shown, the method 300 begins at step 310, where client $110_1$ receives a drag operation in which a file is selected and dragged to a predefined area of the client $110_1$ window. As discussed, the predefined area may generally be of any shape or size, such as rectangular area 120 depicted in FIG. 1. In alternative embodiments, actions other than dragging the file to a predefined area (e.g., right clicking and selecting a "generate URI" option) may be used to invoke creation of the URI.

In response to receiving the drag operation (or an alternative operation), client $110_1$ determines whether an application for opening the dragged file is available in the VM at step 320. Files or types of files may be associated with applications capable of opening the files or file types. For example, file extensions may be associated with corresponding applications, and client $110_1$ may determine, based on such associations, whether an application for opening the file has been deployed in the VM. If no such application has been deployed, then client 110 may display a prompt notifying the user of the need to install such an application.

If, however, an application for opening the file is available, then at step 330, client $110_1$ generates a URI for the file. In one embodiment, remote access client $110_1$ may populate the URI with an application ID corresponding to the application for opening the file and a file ID corresponding to the file itself, as well as authentication credentials and an address of a VM or connection broker to connect to. In addition, the URI may be prefixed with a particular prefix that causes the client application to be launched when the URI is clicked.

The URI's authentication credentials may be used for automatic authentication, and to restrict the URI to one-time (or multiple-time) use. In one embodiment, the URI may include a username and password combination for logging into a virtual machine that is to run the application that opens the file. In another embodiment, the URI may include an RSA authentication token, an AD authentication token, or the like for multiple-factor authentication. In the case of multi-factor authentication, a security server may first authenticate the authentication tokens in the URI before the username and password are authenticated.

Once remote access client $110_1$ generates the URI, the user may deliver the URI to another user via e-mail, a file transfer program, or by any other feasible means. For example, the user may simply copy and paste the URI into an e-mail message. As another example, the user may create a shortcut to the URI and attach the shortcut to an e-mail message. The other user, who receives such a URI or shortcut, may then click on the URI or shortcut to access or download the file.

Figure 4:
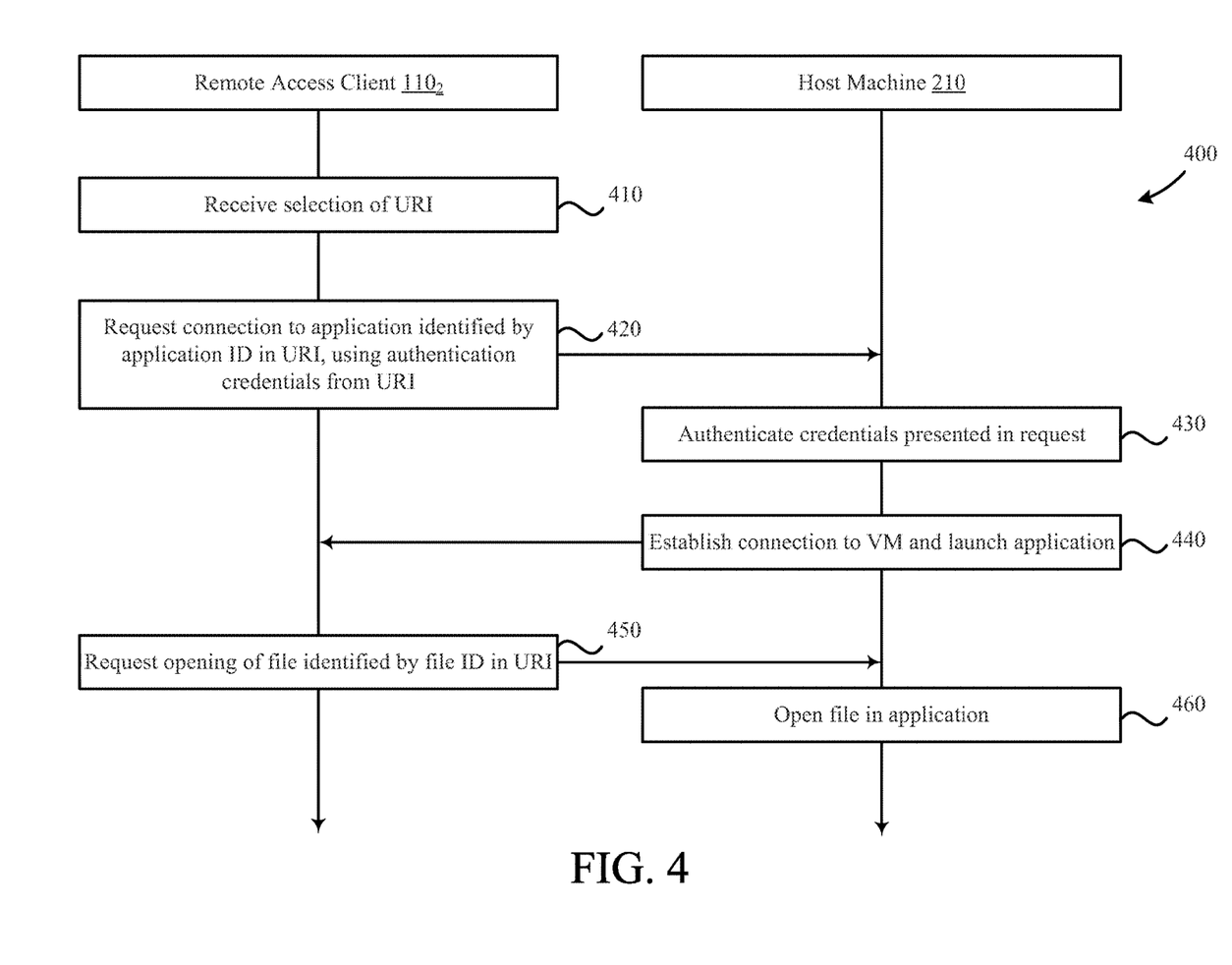
FIG. 4 is a flow diagram of method steps for accessing a file using a URI, according to an embodiment.

FIG. 4 is a flow diagram of a method 400 for accessing a file using a URI, according to an embodiment. As shown, the method 400 begins at step 410, where remote access client $110_2$ receives a selection of the URI for accessing a file. As discussed, a URI may be generated by remote access client $110_1$ and transmitted as the URI itself (i.e., as a character string), or as a shortcut containing the URI. The user who receives such a URI or shortcut may then click on the URI or shortcut to access the file via another remote access client $110_2$, which will typically be running on a different machine than remote access client $110_1$. The URI may also contain a prefix identifying client $110_2$ as the application to launched if the URI is clicked upon, and in such a case, clicking on the URI or shortcut may launch client $110_2$ itself.

At step 420, remote access client $110_2$ requests a connection to the application, identified by the application ID in the URI, using authentication credentials from the URI (if any). Connecting to the application may include connecting to a VM, either directly or via a connection broker whose address is included in the URI, and launching the application in the VM. Once connection with the VM is established, the application may automatically be launched in one embodiment. Alternatively, the steps of connecting with the VM and launching the application may be separate, and may require an additional request by remote access client $110_2$ to launch the application.

At step 430, host machine 210 authenticates the authentication credentials. As discussed, the authentication credentials may include a username and password combination for logging in to a VM, and may additionally include multiple-factor authentication tokens such as an RSA token and an AD token. In the case of multiple-factor authentication, host machine 210 may communicate with a security server that is responsible for authenticating the authentication tokens. If such authentication is successful, then host machine 210 may further authenticate the username and password.

In one embodiment, the authentication credentials may include one-time authentication credentials, in which case host machine 210 may maintain a list of such credentials and invalidate the credentials after a single use. In another embodiment, the particular access policy may be configurable on the remote access client $110_1$ that generated the URI, on host machine 210, or on a connection broker. For example, remote access client $110_1$ may be configured to communicate with host machine 210 to disable access to particular files by invalidating authentication tokens used to access those files on host machine 210, according to a user's preferences. Other examples of access policies include maintaining a user-defined white list of unique IDs of devices that are permitted to use certain URIs or types of URIS, the abilities to set a time limit for accessing a file and disable downloading of the file, and the like.

Assuming the credentials are authenticated, host machine 210 establishes the connection between client $110_2$ and the VM and launches the application identified by the application ID at step 440. Techniques are known for connecting client $110_2$ and the VM, thereby establishing a remoting session. As discussed, the application identified by the application ID may automatically be launched once connection with the VM is established. Alternatively, remote access client $110_2$ may issue an additional request to launch the application if the application is not automatically launched. In one embodiment, the application identified by the application ID may be the only application launched and displayed to the user in the remoting session, so that the user cannot access other resources.

At step 450, client $110_2$ requests opening of a file identified by the file ID specified in the UID. Client $110_2$ may make such a request to open the file without further user input. That is, a single click on the URI (or URI shortcut) may trigger both connection to the application identified by the URI's application ID and opening of the file identified by the URI's file ID.

In response to the request made at step 450, host machine 210 opens the file identified by the file ID at step 460. Similar to the discussion above with respect to the application that is displayed, the file identified by the file ID may be the only file displayed, such that the user does not have access to other files in the VM. In addition to viewing the file, the user may also be permitted to download the file in some embodiments.

Although discussed above primarily with respect to accessing files via VM-based remoting sessions, techniques disclosed herein may also be applied to applications that run in the cloud which are not VM-based. Virtual machines are merely one example of virtualized workload containers that are capable of running the applications on a host server within the scope of the embodiments described herein. In some alternative embodiments, the virtualized workload containers can be implemented using operating system-level virtualization, where the container runs on top of a host operating system, without the need for a hypervisor. In such embodiments, the virtualized workload containers are multiple isolated user space instances, which have been segregated from one another by the kernel of an operating system. Such operating system-level virtualized containers are also sometimes referred to as virtualization engines (VE) or virtual private servers (VPS) and often may look and feel like an individual server from the point of view of its owners and users. This segregation is akin to the VM segregation that is offered in hypervisor-virtualized environments that virtualize system hardware, and thus can be viewed as a form of virtualization that isolates different groups of applications that operate in different containers, which are usually viewed as being more lightweight than VMs. One example of such operating system-level virtualized workload containers is the Linux operating system container provided by Docker, Inc.

Advantageously, embodiments described herein generate URIs for sharing remote session files. Unlike cloud storage and file sharing services which only support a limit number of file types and which require corresponding applications to be installed client-side, embodiments disclosed herein permit any type of file to be shared, so long as an application for opening the file is available on the server side. Further, a single click on the URI (or a shortcut to the URI) may invoke a remote client application that automatically connects to the application and opens the shared file in that application, which is similar in behavior to a local file being opened in a local application. The policy for accessing the file (e.g., a one-time consumption policy or another security policy) may also be configurable on the remote access client, the server, or a connection broker.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for sharing a file between first and second computing devices, the method comprising:
receiving, at the second computing device:
a reference identifying the file and an application associated with the file, wherein the reference is generated by a first remote access client running on the first computing device in response to one or more predefined user interactions with the first remote access client during a first remote session with a virtualized workload container that is facilitated by the first remote access client, wherein the reference is generated by the first remote access client subsequent to determining that the application associated with the file is installed in the virtualized workload container, and wherein the first remote session includes the first computing device receiving and displaying video output generated at a host server hosting the virtualized workload container and routing user input received at the first computing device to the host server where the user input is injected into the virtualized workload container, and
a selection of the received reference;
in response to the selection of the received reference, requesting a connection to be established between a second remote access client running on the second computing device and the application identified in the reference, wherein in response to the connection request the host server launches and executes the application in the virtualized workload container to which the second remote access client is connected during a second remote session; and
requesting the host server open the file identified in the reference.

2. The method of claim 1, further comprising:
launching, in the second computing device, the second remote access client in response to the selection of the reference,
wherein requesting the host server to open the file identified in the reference occurs in response to the selection of the reference.

3. The method of claim 1,
wherein the reference is a uniform resource indicator (URI), and
wherein the reference is selected by clicking on the URI.

4. The method of claim 1,
wherein in response to the connection request, the host server authenticates the connection to the application, and
wherein the reference further includes one or more credentials or tokens used in the authentication.

5. The method of claim 4, wherein the one or more credentials or tokens include one-time authentication credentials which are invalidated by the host server after a single use.

6. The method of claim 1, further comprising:
interfacing to the application running in the virtualized workload container on the host server, wherein the interfacing includes:
causing display information that is generated by the application to be transmitted from the host server to the second computing device,
rendering the display information on the second computing device by the second remote access client,
receiving user input by the second remote access client on the second computing device, and
transmitting the user input to the host server.

7. The method of claim 1,
wherein the host server executing the application maintains a list of devices permitted to use the reference, and
wherein the connection to the application specified by the reference is established in response to determining that the second computing device requesting the connection is in the list of devices permitted to use the reference.

8. A non-transitory computer-readable storage medium embodying computer program instructions for sharing a file between first and second computing devices, the computer program instructions implementing operations comprising:
receiving, at the second computing device:
a reference identifying the file and an application associated with the file, wherein the reference is generated by a first remote access client running on the first computing device in response to one or more predefined user interactions with the first remote access client during a first remote session with a virtualized workload container that is facilitated by the first remote access client, wherein the reference is generated by the first remote access client subsequent to determining that the application associated with the file is installed in the virtualized workload container, and wherein the first remote session includes the first computing device receiving and displaying video output generated at a host server hosting the virtualized workload container and routing user input received at the first computing device to the host server where the user input is injected into the virtualized workload container, and
a selection of the received reference;
in response to the selection of the received reference, requesting a connection to be established between a second remote access client running on the second computing device and the application identified in the reference, wherein in response to the connection request the host server launches and executes the application in the virtualized workload container to which the second remote access client is connected during a second remote session; and
requesting the host server open the file identified in the reference.

9. The computer-readable storage medium of claim 8, the operations further comprising:
launching, in the second computing device, the second remote access client in response to the selection of the reference,
wherein requesting the host server to open the file identified in the reference occurs in response to the selection of the reference.

10. The computer-readable storage medium of claim 8,
wherein the reference is a uniform resource indicator (URI), and
wherein the reference is selected by clicking on the URI.

11. The computer-readable storage medium of claim 8,
wherein in response to the connection request, the host server authenticates the connection to the application, and
wherein the reference further includes one or more credentials or tokens used in the authentication.

12. The computer-readable storage medium of claim 11, wherein the one or more credentials or tokens include one-time authentication credentials which are invalidated by the host server after a single use.

13. The computer-readable storage medium of claim 8, the operations further comprising:
interfacing to the application running in the virtualized workload container on the host server, wherein the interfacing includes:
causing display information that is generated by the application to be transmitted from the host server to the second computing device,
rendering the display information on the second computing device by the second remote access client,
receiving user input by the second remote access client on the second computing device, and
transmitting the user input to the host server.

14. The computer-readable storage medium of claim 8, wherein the host server executing the application maintains a list of devices permitted to use the reference, and wherein the connection to the application specified by the reference is established in response to determining that the second computing device requesting the connection is in the list of devices permitted to use the reference.

15. A system comprising:
a computing device including a processor and a memory, wherein the memory includes a program for sharing a file between the computing device and another computing device, the program being configured to perform operations comprising:
receiving, at the computing device:
a reference identifying the file and an application associated with the file, wherein the reference is generated by a first remote access client running on the other computing device in response to one or more predefined user interactions with the first remote access client during a first remote session with a virtualized workload container that is facilitated by the first remote access client, wherein the reference is generated by the first remote access client subsequent to determining that the application associated with the file is installed in the virtualized workload container, and wherein the first remote session includes the other computing device receiving and displaying video output generated at a host server hosting the virtualized workload container and routing user input received at the other computing device to the host server where the user input is injected into the virtualized workload container, and
a selection of the received reference;
in response to the selection of the received reference, requesting a connection to be established between a second remote access client running on the computing device and the application identified in the reference, wherein in response to the connection request the host server launches and executes the application in the virtualized workload container to which the second remote access client is connected during a second remote session; and
requesting the host server open the file identified in the reference.

16. The system of claim 15, the operations further comprising:
launching in the computing device the second remote access client in response to the selection of the reference,
wherein requesting the host server to open the file identified in the reference occurs in response to the selection of the reference.

17. The system of claim 15,
wherein the reference is a uniform resource indicator (URI), and
wherein the reference is selected by clicking on the URI or on a shortcut which includes the URI.

18. The system of claim 15,
wherein in response to the connection request, the host server authenticates the connection to the application, and
wherein the reference further includes one or more credentials or tokens used in the authentication.

19. The method of claim 1, wherein the one or more predefined user interactions with the first remote access client include an icon representing the file being dragged into a predefined area of a window of the first remote access client.

* * * * *